April 6, 1943.  D. M. MARTINDILL  2,315,632
AMPLIFYING LEVERAGE FOR VEHICLE BRAKES
Filed Nov. 15, 1940
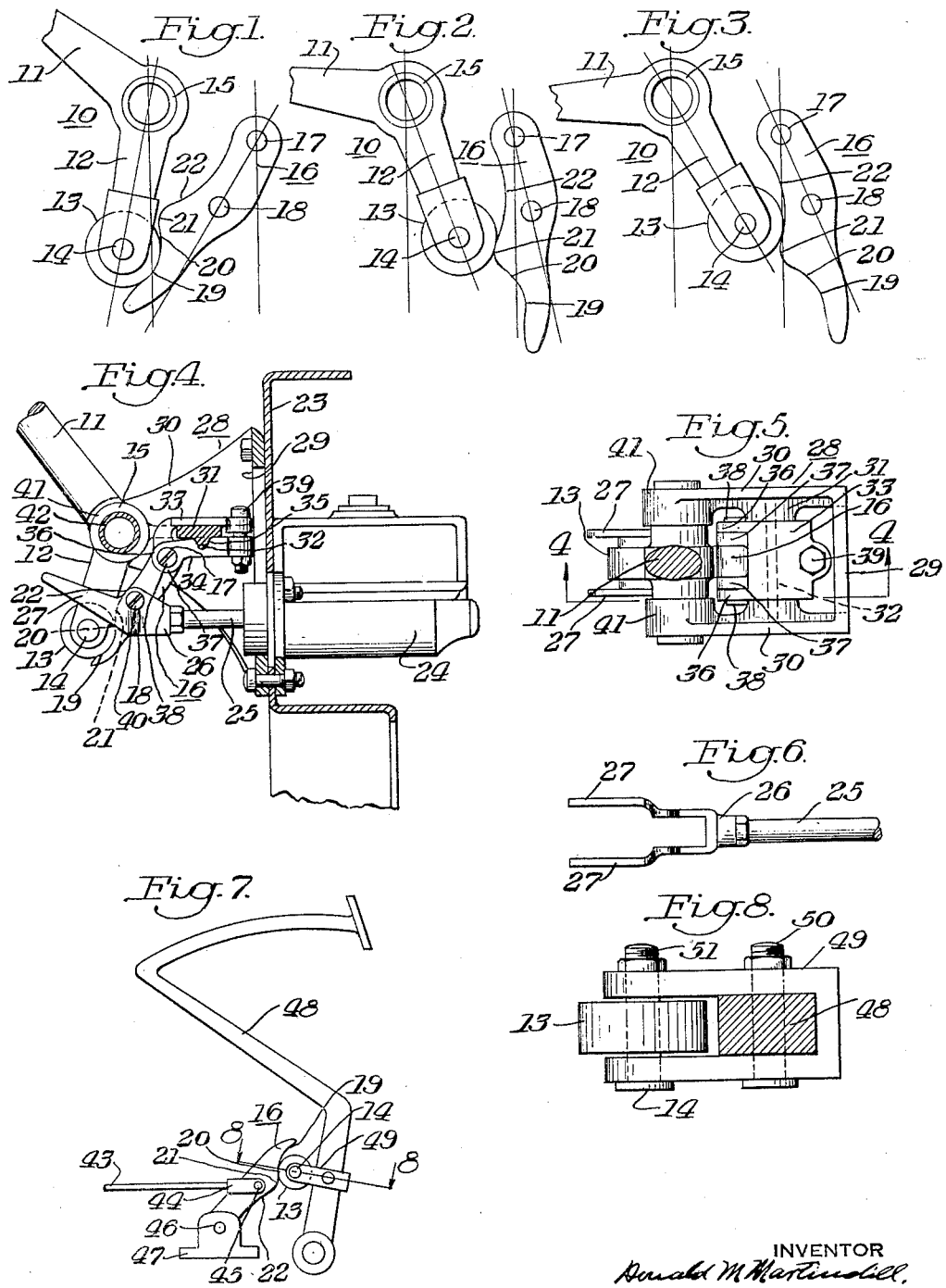
INVENTOR
Donald M. Martindill
BY
Edward A. Lawrence
his ATTORNEY Patented Apr. 6, 1943

2,315,632

UNITED STATES PATENT OFFICE 2,315,632

AMPLIFYING LEVERAGE FOR VEHICLE BRAKES

Donald M. Martindill, Manistee, Mich.

Application November 15, 1940, Serial No. 365,761

6 Claims. (Cl. 74—518)

My invention relates to motor vehicle brakes and comprises certain new and useful improvements in amplifying leverage for transmitting the force due to the movement of the foot pedal, or other actuating device, to the brake mechanism of the vehicle.

In the modern use of motor vehicles in both long and short hauls of passengers and freight, brakes which are capable of quick and effective application are required. In such use overloading beyond the designated rates are common and therefore improved amplifying leverage must be provided to insure safety.

In my present invention one of the characteristic features is the quick tightening of the brake shoes within the drums as the foot pedal is depressed, so that any clearance and spring in the mechanism may be taken up.

Another of such features is that when the shoes have been tightened against the drums the further movement of the foot pedal results in a slower but still powerful application of the brakes.

These characteristics are due to my employment of the novel and improved amplifying leverage which is included in the subject matter of the present invention.

For this purpose I have invented a cam lever whereof the fulcrum or fixed point of pivotal movement is adjacent one extremity of the lever, the energy is applied to the brake mechanism from a point on said cam lever intermediate of its ends, and the force is applied from the foot pedal or other applicator to the cam lever by means of a roller carried by the pedal and traveling along the cam track of the cam lever toward the point thereon from which the energy is applied to the brake mechanism.

The contour of the track or surface of the cam lever which is engaged by the roller is such that any clearance and spring in the brake mechanism are quickly taken up and the brakes tightened, and then as the roller travels along the cam lever in the direction of the fulcrum, the shoes are tightened within the drums at a slower rate.

Other novel features of construction, and also arrangement of parts will appear from the following description.

In the accompanying drawing I have, for the sake of illustration, shown embodiments of the principles of my invention applied to hydraulic brakes, but it is to be also understood that the invention may with great advantage be applied to mechanical brakes.

In said drawing, Figs. 1, 2 and 3 are diagrammatic views in side elevation of the foot pedal, the cam lever and the roller engaging the same.

Fig. 1 shows the amplifying leverage in its position of rest with the brakes "off" or released.

Fig. 2 shows the leverage in its normal "on" or applied position.

Fig. 3 shows the leverage in its fully applied position.

Fig. 4 is a vertical section taken along the line 4—4 in Fig. 5 showing the principles of my present invention applied to the hydraulic brake system of a Ford truck.

Fig. 5 is a plan view of the same, the side element of the chassis and the master cylinder being omitted for the sake of clearness.

Fig. 6 is a plan view of the connecting means of the brake mechanism.

Fig. 7 is a diagrammatic view showing a modified structure wherein my invention is applied to the brake system of a Chrysler truck.

Fig. 8 is an enlarged detail in section along the line 8—8 in Fig. 7.

Referring first to Figs. 1, 2 and 3, 10 indicates the foot pedal, which in this connection is to be understood to include any form of lever or other applicator whereby energy is transmitted by the operator to the amplifying leverage.

The lever 10 is shown as comprising the long arm 11 which is usually provided with a foot plate on its upper end, and a short arm 12 angularly disposed relative to the arm 11 and which is bifurcated at its lower end to receive a roller 13 arranged to rotate on the pivot pin 14. At its angle the lever 10 is provided with a transversely disposed cylindrical hub 15 for mounting the foot pedal to swing, counterclockwise in the drawing to apply the brakes and clockwise to release the brakes. In practice the foot pedal is spring urged in the counterclockwise direction.

The cam lever is indicated at 16 and is fulcrumed or pivotally supported at one end, the upper end in Figs. 1, 2 and 3, a bearing hole 17 being shown for that purpose. Intermediate of its ends the cam lever 16 is provided with means for connecting it to the brake mechanism of the vehicle. Thus I have shown the cam lever provided with a transverse bearing hole 18 to which may be pivotally connected the plunger of the master cylinder of a hydraulic brake system or the operating link of a mechanical brake system, as the case may be.

The cam lever is provided on one of its longitudinal edges, that adjacent the foot pedal and its roller, with a cam track along which the roller travels during both the application and the release of the brakes, the travel of the roller being toward the fulcrum of the cam lever in applying the brakes and away from the fulcrum in releasing the brakes.

Such cam track comprises a preferably arcuate portion 19 with which the roller 13 is held in engagement when the brakes have been released or are "off," as illustrated in Fig. 1. Next to the portion 19 is a rapid rise 20 which the roller 13 mounts in the primary stage of the brake-applying movement of the foot pedal, thus swinging the cam lever rapidly to the right in Fig. 1 and the roller attaining the high point or apex 21, as illustrated in Fig. 2.

Thus in the primary stage of applying the brakes, all clearance and spring in the mechanism are quickly taken up and the shoes are almost instantly tightened against the brake drums, and as the roller continues to climb the rise 20 and approaches and attains the apex 21, the shoes are tightened against the drums to produce sufficient braking effect for the normal control of the vehicle.

Moreover the cam lever and its connections with the brake system, later to be again referred to, may be adjusted so that the roller 13 may move beyond the apex 21 and travel in engagement with the receding track portion 22, thus decreasing the rapidity of the swinging movement of the cam lever and the leverage applied to the brake system of the vehicle, which decrease is counteracted by the natural increase of power exerted by the operator's foot as the pedal descends.

Referring now to Figs. 4, 5 and 6, wherein I have illustrated my invention applied to a hydraulic brake system, 23 indicates one of the cross members of the vehicle chassis, and 24 the master cylinder of the hydraulic brake system, the front end of the master cylinder being open through the web of the member 23 in the usual manner. The piston, not shown, of the master cylinder is spring urged toward the front end of the cylinder, and 25 indicates the plunger which extends into the master cylinder to engage the piston, and which is employed to cause the latter to retreat toward the inner or rear end of the master cylinder to force the hydraulic fluid into the cylinders which operate the brake bands.

The outer protruding end of the plunger 25 has mounted thereon the yoke 26, the head of which is provided with a threaded hole into which the threaded outer extremity of the plunger 25 is screwed.

The yoke is of bifurcated form with spaced apart and forwardly extending cheeks 27.

28 indicates the bracket which is a standard feature of the Ford type of vehicle and which comprises a back plate 29 which is bolted or otherwise mounted against the outer surface of the member 23, and parallel side walls 30 which are horizontally spaced. The side walls 30 are connected intermediate of their height by an integral cross web 31 which is provided on its lower surface with a longitudinally disposed bead 32.

I provide a two part clamp which embraces the web 31, said clamp comprising the upper plate 33 and the lower plate 34. The upper plate bears down on the flat top surface of the web while the lower plate is in flat surface contact with the lower surface of the web, the plate being provided with a groove 35 to receive the bead 32 of the web.

The front edge of the upper plate is provided with a pair of parallel spaced pierced ears 36 which extend downwardly to overlap outwardly a similar pair of ears 37 extending forwardly from the lower plate 34. The clearance between the inner ears 37 is sufficient to receive the upper end of the cam lever 16, and a pivot bolt 38 extends through the pierced ears and the bearing hole 17 of the cam lever 16, thus fulcruming or pivotally suspending the same at its upper end. Thus the pivot bolt 38 forms a hinge connection between the upper and lower plates at the front. At their rear the plates are provided with vertical aligned holes to receive the bolt 39 which when tightened clamps the plates fixedly on the web 31.

The cam lever 16 is straddled by the cheeks 27 of the yoke 26 and is attached thereto by a pivot bolt 40 extending through registering holes in the two cheeks and the bearing hole 18 in the cam lever.

It is evident that by adjusting the yoke 26 relative to the plunger 25, the position of the cam lever and the foot pedal may be regulated relative to the piston of the master cylinder, thus providing means for adjustment.

The outer end of the walls 30 of the bracket 28 are provided with registering and inwardly extending tubular bearing sleeves 41 between which is provided sufficient clearance to receive the hub 15 of the foot pedal 10, a tubular shaft 42 extending through the bearings and hub to pivotally support the foot pedal in place.

The cheeks 27 also straddle the arm 12 of the foot pedal and thus function as guides for the relative movement of the elements.

It will be seen that as the foot pedal is moved counterclockwise in Fig. 4 the contour of the cam track will impart to the cam lever a rapid primary movement which will take up brake shoe clearance and spring in the mechanism, such effect continuing until the roller 13 has attained the track apex 21. If the movement continues, by the further depression of the foot pedal, the roller will travel along the portion 22 of the track moving the cam lever at a slower rate but continually increasing the force effective to tighten the shoes against the brake drum.

In Figs. 7 and 8 I show the application of my invention to another type of brake wherein 43 indicates either a connecting rod of a mechanical brake system or the plunger of a master cylinder of a hydraulic brake system, and which is provided at its end with a bifurcated yoke 44 which straddles the cam lever 16 and is pivotally connected to the bearing hole 18 of the latter as by the pivot bolt 45. The cam lever is fulcrumed at its lower end by means of its pivotal connection at 46 to the yoke bracket 47 fixed to the vehicle chassis. Thus the cam lever in Fig. 7 is inverted from its position shown in the preceding views of the drawing.

In this structure the foot pedal is a bent lever 48 pivotally mounted at its lower end, not intermediate of its ends as in the preceding views. In this structure the movement of the cam lever in applying the brake is shown as clockwise as is also the movement of the foot pedal.

49 indicates a strap bracket embracing, as at 50, the foot pedal 48, and having its free ends or legs extending outwardly toward the cam lever. The roller 13 is journaled between the legs of the bracket on the pivot pin 51 and engages the cam track of the cam lever, which track is inverted from its position illustrated in the preceding views.

The operation of the leverage illustrated in Figs. 7 and 8 is the same as that shown in the preceding views, as in both instances the roller travels toward the fulcrum in applying the brakes.

It is evident that my novel and improved amplifying leverage is of very compact, simple and durable construction, not likely to become impaired either by breakage or undue wear.

I claim:

1. In an amplifying leverage for motor vehicle brakes, the combination with an applicator under the control of the operator, such as a foot pedal, arranged to be swung on a fixed axis and a contact member mounted on the applicator, of a cam lever fulcrumed at one end on a fixed axis and operatively connected at a point intermediate of its ends to the brake mechanism of the vehicle, and a cam track on one longitudinal surface of the cam lever engaged by said member, said member traveling from the free end of the cam lever toward said point of connection in applying the vehicle brakes, the lever swinging through a greater arc of movement than that of the contact member, the track being so contoured that as the lever arm decreases during the primary travel of the roller the rate of application of the brakes increases.

2. In an amplifying leverage for motor vehicle brakes, the combination with an applicator under the control of the operator, such as a foot pedal, arranged to be swung on a fixed axis and a contact member mounted on the applicator, of a cam lever fulcrumed at one end on a fixed axis and operatively connected at a point intermediate of its ends to the brake mechanism of the vehicle, a cam track on one longitudinal surface of the cam lever engaged by said member, said member traveling from the free end of the cam lever toward said point of connection in applying the vehicle brakes whereby the largest lever arm is utilized during the primary travel of the roller, a rapid rise in the track adjacent the portion thereof initially traversed by the member to effect a rapid application of the shoes to the drums, and a recedence in said track adjacent said rise in the direction of the fulcrum to decrease the rate of application of the brakes as the lever arm continues to decrease, the lever swinging through a greater arc of movement than that of the contact member.

3. In an amplifying leverage for motor vehicles, the combination with an applicator, such as a foot pedal, arranged to be swung on a fixed axis and a contact member mounted on the applicator, of a cam lever fulcrumed at one end on a fixed axis and having a cam track on one of its longitudinal surfaces engaged by said member, said member traveling from the free end of the cam lever in applying the brakes, a yoke connected to the brake mechanism and straddling the cam lever and the applicator, and a pivot pin carried by the cheeks of the yoke and extending through a hole in the cam lever intermediate of its ends.

4. A multiplying lever support for a vehicle brake system comprising a pair of plates arranged to embrace a portion of the vehicle chassis, a pair of ears projecting from one end of each plate, aligned holes in each of said ears, a fulcrum pin extending through said holes for pivotally supporting the multiplying lever, and means connecting the other ends of said plates which act in conjunction with said fulcrum pin to clamp the plates to the vehicle.

5. In amplifying leverage for motor vehicle brakes and the like, the combination of a lever pivotally supported at one end on a fixed axis while the other end of the lever is free to swing, a brake operating member pivotally connected to said lever intermediate of the ends of the latter, a power applicator, and a roller carried by said applicator and arranged to travel longitudinally of the lever from the free end of the latter toward the point of connection of the brake operating member to swing the lever through a greater arc of movement than that of the applicator and apply the brakes whereby the largest lever travel is employed in the initial application of the brakes to take up slack and spring in the brake mechanism.

6. In amplifying leverage for motor vehicle brakes and the like, the combination of a lever pivotally supported at one end on a fixed axis while the other end of the lever is free to swing, a brake operating member pivotally connected to said lever intermediate of the ends of the latter, a power applicator, a roller carried by said applicator and arranged to travel longitudinally of the lever from the free end of the latter toward the point of connection of the brake operating member to swing the lever through a greater arc of movement than that of the applicator and apply the brakes whereby the largest lever travel is employed in the initial application of the brakes to take up slack and spring in the brake mechanism, and a cam rise on the surface of the lever adjacent its free end in engagement with which the roller travels to cause an increase in the rate of brake application as the lever arm decreases.

DONALD M. MARTINDILL.